United States Patent [19]

Clifton et al.

[11] Patent Number: 5,394,946
[45] Date of Patent: Mar. 7, 1995

[54] ROW CLEANING ATTACHMENT

[75] Inventors: Kenneth R. Clifton, Coal Valley; David J. Rylander, Victoria, both of Ill.

[73] Assignee: Deere & Company, Moline, Ill.

[21] Appl. No.: 79,305

[22] Filed: Jun. 16, 1993

[51] Int. Cl.6 .................................. A01C 5/06
[52] U.S. Cl. ........................... 172/139; 111/73; 111/140; 172/572; 172/536; 172/559; 172/538
[58] Field of Search .............. 111/73, 85, 88, 139, 111/140, 141, 143, 87; 172/138, 194, 156, 694, 378, 184, 572, 574, 522, 139, 559, 538, 171, 172, 158, 539, 561, 562, 836

[56] References Cited

U.S. PATENT DOCUMENTS

| | | | |
|---|---|---|---|
| 3,605,907 | 7/1969 | Schuring et al. | 172/378 |
| 3,815,684 | 6/1974 | Smith | 172/694 |
| 4,009,668 | 3/1977 | Brass et al. | |
| 4,131,162 | 12/1978 | Schmitz. | |
| 4,295,532 | 10/1981 | Williams et al. | 172/184 |
| 4,425,973 | 1/1984 | Williams et al. | |
| 4,430,952 | 2/1984 | Murray | 111/85 |
| 4,461,355 | 7/1984 | Peterson et al. | 172/156 |
| 4,483,401 | 11/1984 | Robertson | 172/574 |
| 4,560,011 | 12/1985 | Peterson et al. | 172/194 |
| 4,660,653 | 4/1987 | Mayeda et al. | 172/522 |
| 4,785,890 | 11/1988 | Martin. | |
| 4,796,550 | 1/1989 | Van Natta et al. | |

FOREIGN PATENT DOCUMENTS 0117745 9/1984 Germany.

OTHER PUBLICATIONS

Yetter Brochure entitled "Move It", published in U.S.A., Jul. 1992.

*Primary Examiner*—Dennis L. Taylor
*Assistant Examiner*—Robert E. Pezzuto

[57] ABSTRACT

A row cleaning attachment for seeding equipment comprising a coulter mounted between and behind two press wheels having a uniform circumference. The press wheels are independently spring biased downwardly into contact with the ground for holding and pulling the crop residue away from the planting line of the planting unit. The coulter has a larger diameter than the press wheels and is located so that the cutting edge of the coulter cuts the residue material as it is being tensioned between the press wheels.

9 Claims, 3 Drawing Sheets

ROW CLEANING ATTACHMENT

BACKGROUND OF THE INVENTION

1. Field of the Invention

The present invention is directed to a row cleaning attachment to be used with agricultural seeding equipment for cleaning crop residue from a very narrow strip of soil along the planting line.

2. Background of the Invention

Agricultural seeding equipment, such as row crop planters and grain drills, maybe provided with row cleaning attachments of the kind disclosed in U.S. Pat. No. 4,785,890. Increasingly farmers are switching to no-till or low-till residue management practices in which fields are not plowed or tilled to any appreciable degree between crops. Such practices put added burdens on seeding equipment. For example, crop residue and debris encountered by the seeding equipment may adversely affect seed placement, seed/soil contact, seed emergence and seed germination.

Double cropping soybeans after winter wheat is a popular crop rotation system used in the southern portion of the midwestern United States. The soybeans are typically planted in freshly cut wheat stubble to preserve soil moisture at planting and help control erosion. The freshly cut wheat stubble is slippery and has no chance to weather or deteriorate. As such it is difficult for the seed openers of the soybean seeding equipment to cut the stubble and large amounts of crop residue can be hairpinned into the seed trench causing poor seed/soil contact and poor seeding emergence. In addition many double cropped beans are planted in narrow rows (15 inch or smaller). Currently marketed row cleaners displace too wide a band of residue and therefore are not compatible with narrow row spacings. Farmers do not want a wide bare strip of soil, as wide bare strips are susceptible to rapid drying and crusting when planted in mid-summer.

SUMMARY

It is an object of the present invention to provide a row cleaning attachment that only disturbs a very narrow strip of soil through which the furrow opener of the seeding equipment passes.

The row cleaner of the present invention comprises two independently spring biassed press wheels which fix the crop residue and pull it outwardly from the planting line of the planting unit. A coulter having a cutting edge is located behind and between the press wheels for cutting crop residue. Crop residue engaged by both wheels is tensioned by both wheels pulling it outwardly. The coulter engages and cuts the tensioned crop material. After the crop residue is cut by the coulter, the wheels pull the cut crop material further away from the planting line of the planting unit. The wheels only clean a very narrow band along the planting line of the planting unit, so only a very narrow area of soil is exposed to the sun.

For pulling the crop residue outwardly from the planting line, the press wheels are arranged in a V-shaped configuration having an open vertex and an open base. The imaginary vertex of the press wheels would lie on the planting line. The press wheels themselves do not intersect the planting line. The coulter projects into the V formed by the press wheels through the base of the V. The outer periphery edge of the coulter comprises a cutting edge that cuts crop residue tensioned between the press wheels.

The press wheels have a uniform circumference and ride on the surface of the ground on either side of the planting line. The press wheels do not project into the ground.

DETAILED DESCRIPTION

Figure 1:
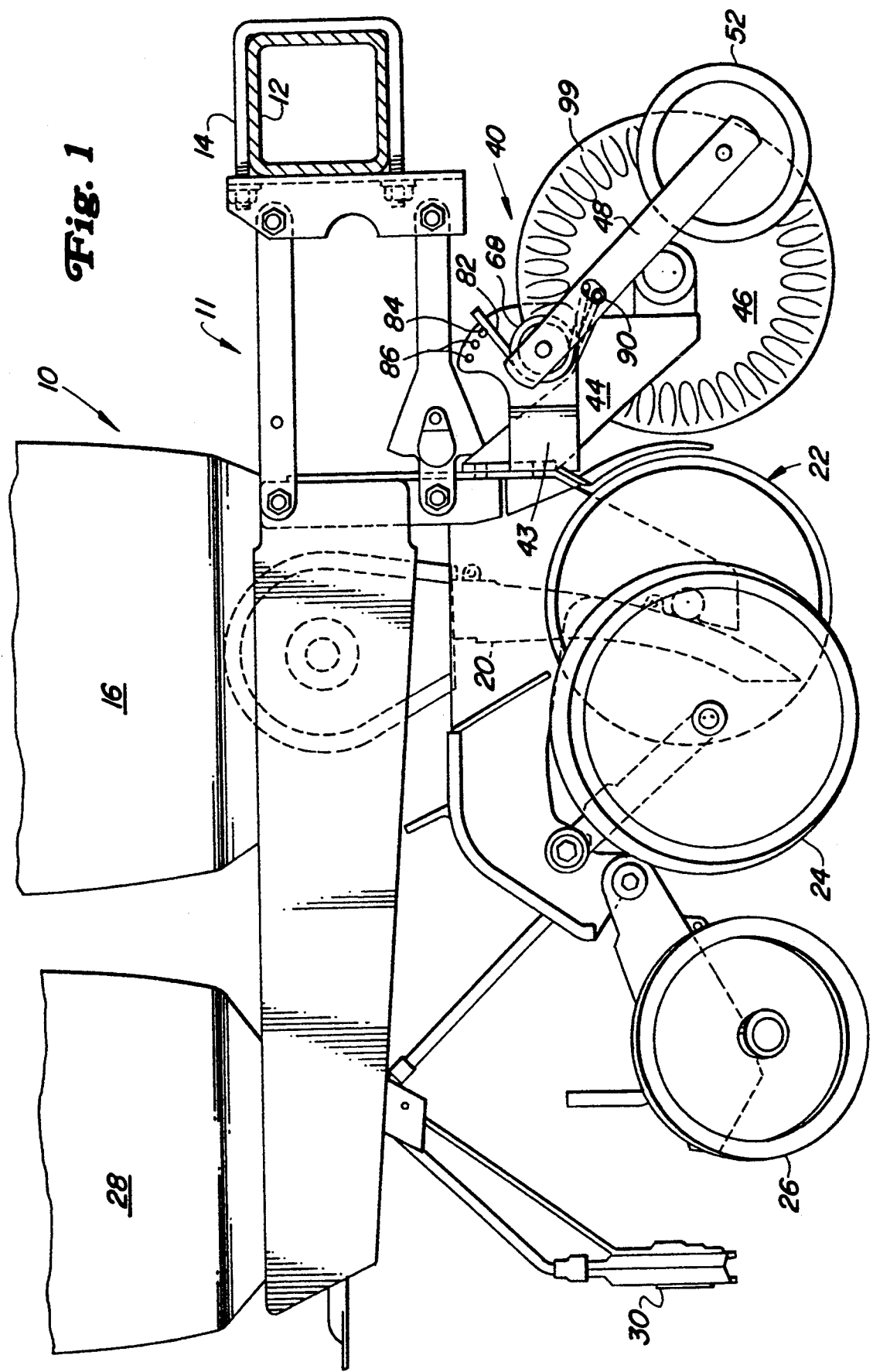
FIG. 1 is a side view of a planting unit on which is mounted the row cleaner attachment of the present invention.
Figure 2:
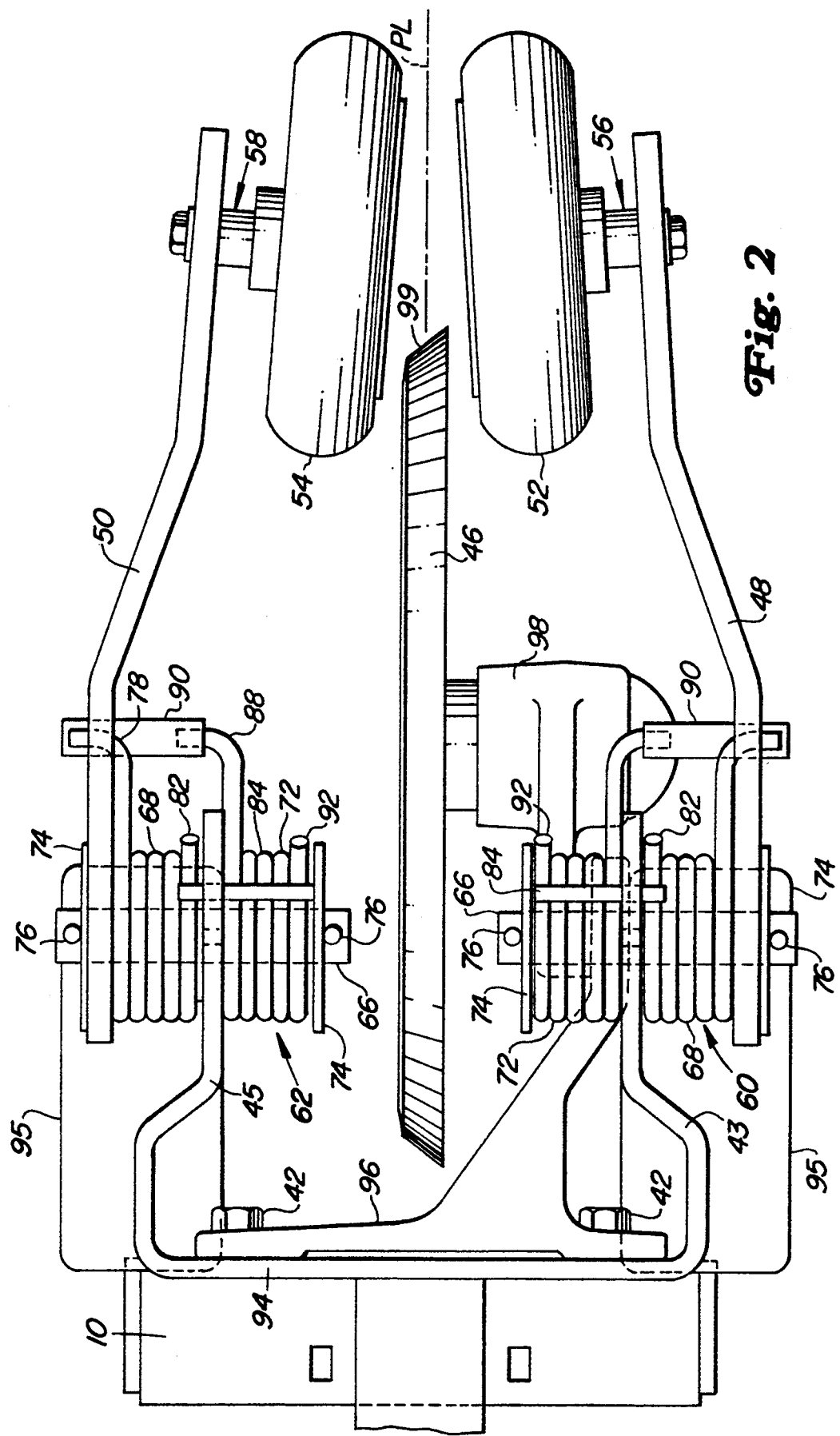
FIG. 2 is a top view of the planter attachment of the present invention.
Figure 3:
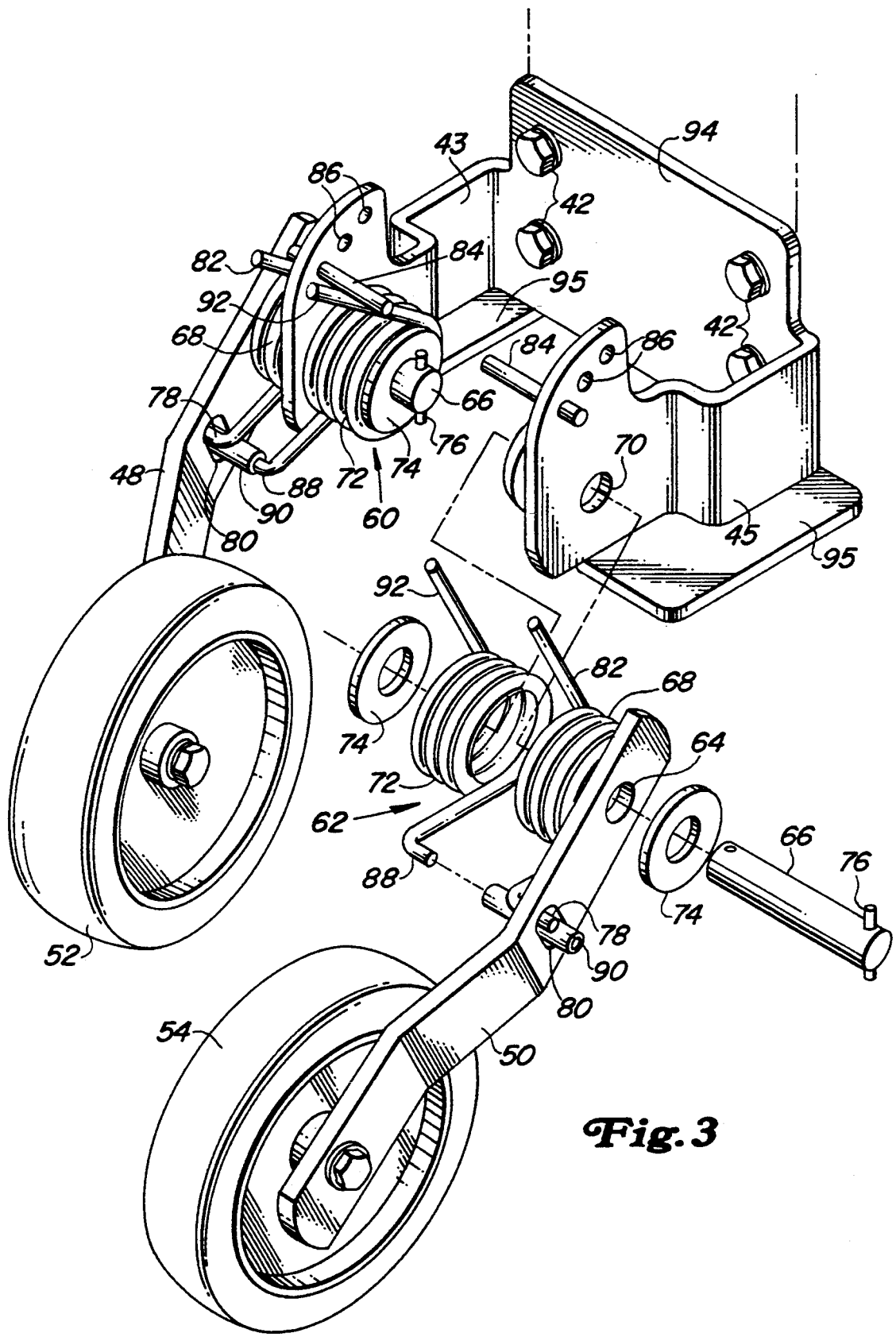
FIG. 3 is an exploded perspective view of the press wheels of the present invention.

FIG. 1 discloses an agricultural planting unit 10. The placating unit is provided with a parallel linkage 11 that is mounted to toolbar 12 by U-bolts 14 in a conventional manner. The planting unit is provided with a seed bin 16 which directs seeds to a seed meter 18. The seed meter 18 directs the measured seeds to a seed tube 20 for placing the seeds into the seed trench. The seed trench of formed by a furrow opener 22. Gauge wheels 24 control the depth of the furrow opener 22. Closing wheels 26 close the trench after the seed has been deposited into the trench by the seed tube 20. The illustrated planting unit is also provided with a pesticide bin 28 for directing pesticide to the ground by applicator 30. A suitable pesticide meter (not shown) controls the application of the pesticide.

The above disclosed planter is of a relatively conventional configuration. Typically a plurality of planting units are mounted on toolbar 12 so that a farmer could plant more than one row in a single pass over the field. Although the present invention is illustrated as being mounted to a row crop planting unit 10 it could also be mounted to other seeding equipment like grain drills, and as such the invention should not be limited to row crop planters. Each planting unit, be it on a grain drill or row crop planter, defines a planting line through which the furrow opener passes making the trench in which the seed tube deposits seed.

The row cleaning attachment 40 is bolted by bolts 42 to the front of the planting unit 10 immediately beneath the parallel linkages. The row cleaning attachment 40 comprises three forwardly extending members 43, 44 and 45 to which are rotatably mounted bubble coulter 46, and to which are pivotally mounted press wheel pivot arms 48 and 50. Press wheels 52 and 54 are rotatably mounted to the pivot arms 48 and 50 by bearing assemblies 56 and 58, respectively. It should be noted that the present invention is illustrated as having a bubble coulter but other coulter could also be used and the invention is not limited to bubble coulters.

The pivot arms 48 and 50 are biassed downwardly by dual spring assemblies 60 and 62. The first end of each pivot arm is provided with an aperture 64 through which pivot pin 66 is inserted. The pivot pin then extends through a first spring 68 of the respective dual spring assembly 60 or 62. After passing through the first spring 68 the pivot pin is inserted through an aperture 70 located on the respective forwardly extending member 43 or 45. The pivot pin 66 then extends through the second spring 72 of the respective dual spring assembly 60 or 62. Washers 74 at each end of the pivot pin together with locking pins 76 hold the assembly together.

The first spring 68 of each dual spring assembly 60 or 62 has a first end 78 that is inserted into elongated slot 80 located on the respective forwardly extending members 43 or 45. The second end 82 of the first spring 68 engages biassing set pin 84 which is mounted in one of three holes 86 formed in the forwardly extending members 43 and 45. By moving the biassing set pin 84 between the three holes 86 the downward force on the pivot arms and thereby the press wheels can be controlled.

The second spring 72 of each dual spring assembly 60 and 62 has a first end 88 which is inserted into a rigid extension sleeve 90. Extension sleeve 90 is welded to the bottom of the elongated slot 80. The extension sleeve reduces the number of different parts needed for dual spring assemblies by allowing the same springs to be used in each dual spring assembly. The second end 92 of the second spring 72 engages biassing set pin 84 in the manner described above regarding the first spring 68.

The dual spring assemblies bias the press wheels 52 and 54 downwardly against the ground surface. The mounting assemblies 56 and 58 of the press wheels are configured first hold and then pull crop residue away from the planting line PL. The planting line PL is located between the press wheels. The press wheels are arranged in a V-shaped configuration having an open vertex. The imaginary vertex of the press wheels would lie on the planting line PL.

The three forwardly extending members comprise two parts. The first part is a U-shaped bracket 94 having forwardly extending members 43 and 45. The bottom of each forwardly extending member 43 and 45 is provided with a stop plate 95. The dual spring assemblies bias the pivot arms downwardly against the stop plates 95. The second part is a support member 96 having a bearing member 98 for rotatably mounting the coulter 46 to the member. Both parts are mounted to the planting unit by bolts 42.

As shown in the drawings, the central rotational axis of the coulter 46 is located behind the press wheels 52 and 54. The outer periphery of the coulter 46 is provided with a cutting edge 99 which is used to cut crop residue tensioned between the press wheels 52 and 54.

As the planting unit 10 is pulled forward the press wheels 52 and 54 contact the ground on either side of the planting line PL. The press wheels 52 and 54 are rotated by there contact with the ground. The press wheels 52 and 54 drag the crop residue outwardly from the planting line by their V-shaped configuration. Crop residue contacting both press wheels 52 and 54 is tensioned by the outward pull of both wheels. The cutting edge 99 of the coulter 46 contacts the tensioned crop residue cutting it and allowing the press wheels to pull the severed portions outward from the planting line.

The invention should not be limited by the above-described embodiment, but should be limited solely by the claims that follow.

We claim:

1. A row cleaning attachment for seeding equipment, the seeding equipment having a furrow opener defining a planting line, the attachment comprising:

a pair of press wheels located upstream of the furrow opener, the pair of press wheels straddle the planting line and form a V-shaped configuration with an open vertex and an open base, the open vertex lies on the planting line, the press wheels engage crop residue located on either side of the planting line and pull the crop residue outwardly from the planting line; and a coulter is located behind and between the press wheels along the planting line and passes through the open base of the press wheels, the coulter is provided with an outer periphery having a cutting edge that cuts crop residue tensioned between the pair of press wheels.

2. A row cleaner attachment as defined by claim 1 further comprising two forwardly extending members on which are pivotally mounted two pivot arms, each pivot arm has a first end that is pivotally attached to one of the two forwardly extending members and a second end on which is rotatably mounted the press wheels.

3. A row cleaner attachment as defined by claim 2 further comprising a forwardly extending member on which is rotatably mounted the coulter.

4. A row cleaner attachment as defined by claim 3 wherein the press wheels have a uniform circumference and ride on the soil surface.

5. A row cleaner attachment as defined by claim 4 wherein each pivot arm is independently biassed downwardly by two independent spring assemblies.

6. A row cleaner attachment as defined by claim 5 wherein each independent spring assembly is provided with an adjustable bias set pin which contacts the spring assembly and can be adjusted for adjusting the biassing force applied to the pivot arms by the spring assemblies.

7. A row cleaner attachment as defined by claim 6 wherein each of the two forwardly extending members on which the pivot arms are mounted is provided with a stop member for engaging the pivot arms and preventing further downward rotation of the pivot arms.

8. A row cleaner attachment as defined by claim 7 wherein each of the two forwardly extending members on which the pivot arms are mounted is provided with at least two holes in which the bias set pins are inserted.

9. A row cleaner attachment as defined by claim 8 wherein each spring assembly comprises two springs that contact the bias set pin and the pivot arms.

* * * * *